(12) United States Patent
Yokochi

(10) Patent No.: US 7,627,192 B2
(45) Date of Patent: Dec. 1, 2009

(54) DIFFERENTIATING HALF TONE AREAS AND EDGE AREAS IN IMAGE PROCESSING

(75) Inventor: Atsushi Yokochi, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 727 days.

(21) Appl. No.: 11/175,394

(22) Filed: Jul. 7, 2005

(65) Prior Publication Data
US 2006/0007497 A1    Jan. 12, 2006

(30) Foreign Application Priority Data
Jul. 7, 2004 (JP) ............... 2004-200886

(51) Int. Cl.
G06K 15/00 (2006.01)
(52) U.S. Cl. .................. 382/261; 358/3.27
(58) Field of Classification Search ............ 358/3.27; 382/261, 264, 266
See application file for complete search history.

(56) References Cited

U.S. PATENT DOCUMENTS

| | | | |
|---|---|---|---|
| 5,032,903 A * | 7/1991 | Suzuki et al. | 358/530 |
| 5,247,588 A | 9/1993 | Komatsu | |
| 5,513,280 A * | 4/1996 | Kawamura | 382/266 |
| 2003/0169442 A1 | 9/2003 | Yokochi | |

FOREIGN PATENT DOCUMENTS

| | | |
|---|---|---|
| JP | 61-118071 | 6/1986 |
| JP | 2-274173 | 11/1990 |
| JP | 3-85061 A | 4/1991 |
| JP | 4-096572 | 3/1992 |
| JP | 7-115542 A | 5/1995 |
| JP | 2002-016815 A | 1/2002 |
| JP | 2002-125126 A | 4/2002 |
| JP | 2002-286843 | 10/2002 |
| JP | 2003-264689 | 9/2003 |
| JP | 2003-264689 A | 9/2003 |

OTHER PUBLICATIONS

JP Office Action dtd Sep. 9, 2008, JP App. 2004-200886.
JP Office Action dtd Feb. 24, 2009, JP Appln. 2004-200886.

* cited by examiner

Primary Examiner—Charles Kim
Assistant Examiner—Stephen R Koziol
(74) Attorney, Agent, or Firm—Banner & Witcoff, Ltd.

(57) ABSTRACT

An image processing apparatus is provided with a luminance component extracting system adapted to extract a luminance component from image data consisting of a plurality of image pixels arrange in a matrix, a first filter, first data being generated as the first filter is applied to the luminance component, an edge detecting system that detects an edge in the first data, a second filter, second data being generated as the second filter is applied to the luminance component, a third filter, third data being generated as the third filter is applied to the luminance component, an outputting system adapted to output the second data and the third data, and a selection controlling system adapted to control, in response to the result of edge detection, the outputting system to selectively output one of the second data and the third data.

20 Claims, 13 Drawing Sheets

IMAGE DATA FOR
EDGE 1
FIG.12A

IMAGE DATA 3 × 3 AFTER
MOVING-AVERAGE
PROCESS
FIG.12B

EDGE AREA AFTER
SOBEL FILTER
PROCESS
FIG.12C

EDGE AREA AFTER
LAPLACIAN FILTER
PROCESS
FIG.12D

IMAGE DATA FOR
HALFTONE DOTS 1
FIG.12E

IMAGE DATA 3 × 3 AFTER
MOVING-AVERAGE
PROCESS
FIG.12F

EDGE AREA AFTER
SOBEL FILTER
PROCESS
FIG.12G

IMAGE DATA FOR
HALFTONE DOTS

FIG. 13A

IMAGE DATA 3 X 3 AFTER
MOVING-AVERAGE
PROCESS

FIG. 13B

EDGE AREA AFTER
SOBEL/LAPLACIAN FILTER
PROCESS

FIG. 13C

EDGE AREA AFTER
LAPLACIAN FILTER
PROCESS

FIG. 13D

IMAGE DATA FOR
EDGE 1

FIG.14A

IMAGE DATA 3 × 3 AFTER
MOVING-AVERAGE
PROCESS

FIG.14B

EDGE AREA AFTER
SOBEL FILTER
PROCESS

FIG.14C

EDGE AREA AFTER
LAPLACIAN FILTER
PROCESS

FIG.14D

$g(ij) = sqrt((\Delta i)^2 + (\Delta j)^2)$ $\Delta i$

| -1 | 0 | 1 |
|---|---|---|
| -2 | 0 | 2 |
| -1 | 0 | 1 |

$\Delta j$

| -1 | -2 | -1 |
|---|---|---|
| 0 | 0 | 0 |
| 1 | 2 | 1 |

FIG.15

DIFFERENTIATING HALF TONE AREAS AND EDGE AREAS IN IMAGE PROCESSING

CROSS REFERENCE TO RELATED APPLICATION

This application claims priority from Japanese Patent Application No. 2004-200886, filed on Jul. 7, 2004, the entire subject matter of the application is incorporated herein by reference.

BACKGROUND OF THE INVENTION

1. Technical Field

Aspects of the invention relate to an image processing method, a program product containing instructions to carry out the method, and an image processing apparatus employing the image processing method.

2. Related Art

Conventionally, when an image that has been captured by a scanner is to be printed, a smoothing filter is typically used to smooth the image by reducing noise components and halftone dots from the image data.

Further, in general, the image data scanned by the scanner is evenly blurred and lacks sharpness. Therefore, in order to avoid vague outlines or edges of the image scanned by a scanner, especially of characters and thin lines, edges are generally enhanced using a spatial filter that enhances edges.

It is noted that, however, when an image processing apparatus is configured such that the smoothing filter is provided and smoothing is simply applied to an image captured by the scanner, sharpness of the image is diminished, while other important information on images such as characters and lines is deteriorated. On the other hand, if an image including halftone dot areas is captured and the edge enhancement is applied by simply using the edge enhancement filter, the edge areas are enhanced while the halftone dot areas, which are desired to be rather smoothed, are also enhanced, and roughness of the image is increased.

In order to avoid the above problem, for example, the image processing apparatus configured with a circuit that enables to determine whether an image captured includes halftone dot areas is known. and if the halftone dot areas are detected, smoothing is applied to such halftone dot areas while the other edge areas are enhanced by the edge enhancement filter. If such a configuration is to be employed, however, in addition to a circuit for judgment, it becomes necessary that a process to judge the halftone areas is performed. In order to detect halftone dot areas precisely with this circuit, analysis based on peripheral data is necessary, which requires larger circuit. Even with a larger circuit, however, images captured are likely to be blurred as described above, which does not necessarily ensures a precise judgment, thus deteriorating in quality of the images.

Alternatively, the image processing apparatus may be configured such that a smoothing filter for smoothing an image is used to apply a smoothing effect only to the image judged to be halftone dot, and thereafter, the edge enhancement is applied. According to such a configuration, the inappropriate edge enhancement of the halftone dot area is avoidable, and sharpness of the edge areas is maintained. An example of such a configuration is disclosed in Japanese Patent Publication No. 8-8637.

According to the above configuration, a smoothing filter is applied to an image data, and edge signals are extracted from the image by applying an edge-extracting filter. Then, based on the extracted edge signals, edge areas are enhanced while the other areas are smoothed so that noises are removed. In this process, the same smoothing filter is used for detection of edge areas and for removing noises in order to enhance the detected edges. In order to remove halftone dot elements, when an intensive smoothing filter is applied to an area with fine characters wherein vertical lines and horizontal lines are crossed, such area may be considered as a halftone dot area and smoothed accordingly. Thus, when the image data processed by the intensive smoothing filter is output, fine characters therein may be processed similarly to the halftone dot area and may lose the textual information thereof.

Therefore, in order to separate the halftone dot areas as non-edge areas while maintaining quality of image information of fine characters, it is necessary to select the smoothing process and edge-extracting function properly. However, by use of such a filter, images of fine characters may more likely be incorrectly detected as non-edge areas in separating the image areas. Therefore, although the data processed with the smoothing filter is output as data at a non-edge area, it represents a blurred image.

SUMMARY OF THE INVENTION

Aspects of the present invention are advantageous in that an improved method of image processing with which design freedom of the image processing apparatus can be improved is provided.

BRIEF DESCRIPTION OF THE ACCOMPANYING DRAWINGS

Figure 1:
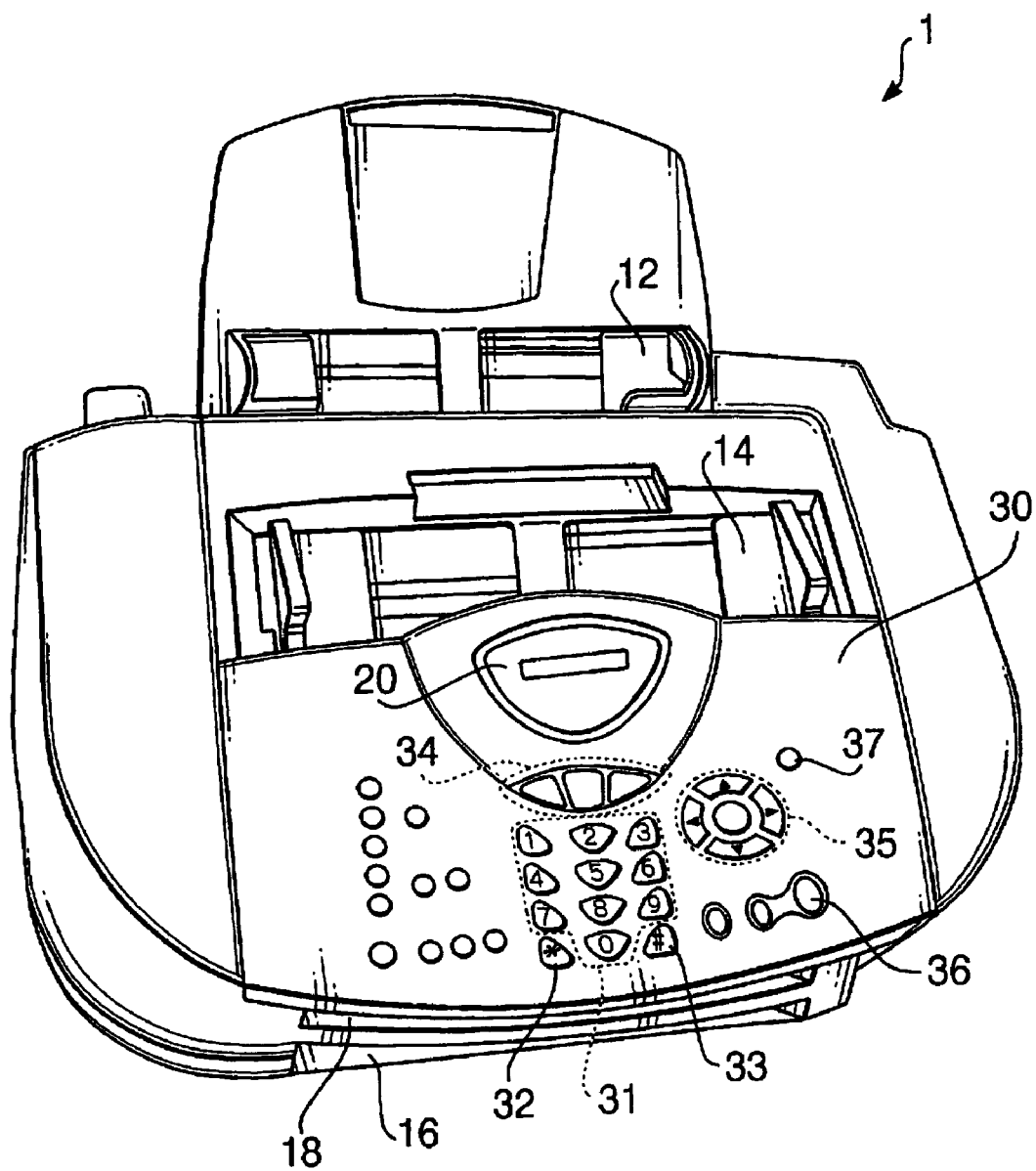
FIG. 1 is a perspective view of an MFP (Multi Function Peripheral) according to an illustrative embodiment of the invention.

FIGS. 12A, 12B, 12C, 12D, 12E, 12F, and 12G show examples of image data including a halftone dot area with a halftone dot in every three pixels.

FIG. 13A shows image data with halftone dots.

FIG. 13B shows the same image data as that shown in FIG. 13A but after the average process has been applied.

FIG. 13C is the same image data after the Sobel filter has been applied to the averaged pixels.

FIG. 13D is the same image data after the Laplacian filter has been applied.

FIGS. 14A, 14B, 14C and 14D illustrate the image output with more gradual edges.

FIG. 15 shows multiplying coefficients in horizontal and vertical directions.

DETAILED DESCRIPTION

General Overview of Aspects of the Invention

The following describes general aspects of the invention that may or may not be included in various embodiments/modifications. Also, it is noted that various connections are set forth between elements in the following description. It is noted that these connections in general and, unless specified otherwise, may be direct or indirect and that this specification is not intended to be limiting in this respect.

According to some aspects of the invention, there is provided an image processing apparatus, which is provided with a luminance component extracting system adapted to extract a luminance component from image data consisting of a plurality of image pixels arrange in a matrix, a first filter, first data being generated as the first filter is applied to the luminance component, an edge detecting system that detects an edge in the first data, a second filter, second data being generated as the second filter is applied to the luminance component, a third filter, third data being generated as the third filter is applied to the luminance component, an outputting system adapted to output the second data and the third data, and a selection controlling system adapted to control, in response to the result of edge detection, the outputting system to selectively output one of the second data and the third data.

The first filter may be a smoothing filter adapted to apply an a×b matrix spatial filter to the luminance data for smoothing, all the filtering factors constituting the first filter are equal to each other.

The second filter may be a smoothing filter adapted to apply an c×d matrix spatial filter to the luminance data for smoothing, all the filtering factors constituting the second filter are configured such that filter coefficients at a central portion of the spatial filter are larger than the filter coefficients at the other portion.

The third filter may include a smooth filter adapted to apply a c×d matrix spatial to the luminance component for smoothing, and an enhancing filter adapted to enhance the smoothed luminance component in accordance with the edge detected by the edge detecting system.

The edge detecting system may include a first edge detecting system adapted to apply a primary differentiation to the first data, and a second edge detecting system that detects continuous pixels including a target pixel from the first data.

The image processing apparatus may further include a calculating system adapted to calculate values of a and b representing a size of the matrix in accordance with a resolution of the image data and the number of halftone dot lines in halftone dot areas included in the image data.

The calculating system may determine odd numbers close to the results of division of resolutions in a main scanning direction and an auxiliary scanning direction by the number of halftone lines as the values of a and b, respectively.

According to further aspects, there is provided a method of processing image data employed in an image processing apparatus. The method includes the steps of extracting a luminance component from image data consisting of a plurality of image pixels arrange in a matrix, applying a first filter to the luminance component to generate first data, detecting an edge in the first data, applying a second filter to the luminance component to generate second data, applying a third filter to the luminance component to generate third data, and selectively outputting, in response to the result of edge detection, one of the second data and the third data.

According to furthermore aspects, there is provided a computer program product including computer readable instructions adapted to cause a computer to carry of the method of processing image data employed in an image processing apparatus as above.

According to some aspects of the invention there may be provided an image processing apparatus, which includes a component generating system that generates components of image data input externally using spatial filters having different functions, an average processing system that applies a smoothing process to an image represented by image data input externally to generate averaged data using a moving-average filter; an edge judging system that determines whether the image represented by the averaged data includes edge areas based on the averaged data generated by the average processing system; and a selecting-outputting system that selects component data according to a determination result by the edge judging system from among the components generated by the component generating system. The component generating system may generate a plurality of pieces of component data by applying to the image data a smoothing filter that smoothes the image represented by the image data and applying to the image data an edge-enhancing filter that enhances edge areas of the image represented by the image data. The selecting-outputting system may transmit component data which the component generating system generates using the smoothing filter if the edge determining system determines that no edge area is included, and may transmit component data which the component generating system generates using the edge-enhancing filter if the edge determining system determines that the edge area is included.

According to the above configuration, a spatial filter generating the component data and a spatial filter used for judging the edge areas (e.g., a moving-average filter) are configured as different filters. Therefore, it becomes possible to set appropriate parameters for generating the component data and for smoothing (e.g., averaging) suitable for edge detection independently. In the conventional apparatus, as described above, parameters of one spatial filter must be set to satisfy complicated conditions so that both the data generation and smoothing are performed appropriately. On the contrary, according to the configuration above, such complicated setting of the parameters are unnecessary, which improves the design freedom of the image processing apparatus.

In particular, according to the above configuration, it is possible that a filter used for edge detection can apply smoothing so that the halftone dot component will not be detected as the edge areas and can be used independently from a spatial filter used for generating the component data.

Regarding the smoothing of the image data, it may be possible to use a generally known smoothing filter in which weighting of a unit area with a target pixel being located at the center of the unit area is performed (such an area will be referred to as a target area, hereinafter). In the above case, if the target pixel is at the center of the halftone dots, although the unit area including the target pixel is smoothed with the weighting algorithm, if the difference of the components between the target pixel and peripheral pixels is large (i.e., if the contrast therebetween is large), the smoothing may not be done sufficiently. This problem can be solved by use of the moving-average filter. With the moving-average filter, the component of the target pixel can be leveled even if the target pixel is at the center of the halftone dots, and smoothing can be performed so that the components of the halftone dots will not be detected as the edge areas.

The configuration of the edge judging system is not limited to a particular configuration if it can judge, based on the averaged data, whether an edge area is included in the unit image. For example, it is sufficient that the edge judging system judges that the edge area is included if an edge area is detected by applying a spatial filter for edge detection to the averaged data.

In an illustrative aspect, it may be possible to use a Sobel filter which is know as a spatial filter for edge detection. That is, for example, the edge judging system may determine that the edge areas are included in the image represented by the smoothed data if the edge areas are detected from the averaged data when the Sobel filter is applied to the averaged data.

According to the above configuration, it is possible to extract the edge areas from the averaged data using the Sobel filter, and based on the fact that the edge areas have been extracted, a decision is made such that the edge areas are included in the image represented by the averaged data. It should be noted that, according to a first illustrative embodiment, the Sobel filter is applied to the component which is averaged using the moving-average filter. It is preferable to use the Sobel filter for the components averaged by the moving-average filter since, in comparison with a case where another spatial filter (e.g., Laplacian filter) is used, the halftone dot areas will hardly be detected as the edge areas, as indicated in the results of an experiment described later.

When the Sobel filter is used in the edge judging system as described above, in particular cases, an area which should be detected as the edge area may not be detected as the edge area due to the functions of the Sobel filter. The Sobel filter uses areas other than the areas aligned in a line with the target area located at the center. Therefore, if the components which constitute an edge area are aligned in a line, the Sobel filter may not judge that the edge area is included.

To avoid the above deficiency, a configuration below may be employed. That is, the edge judging system may include: a first edge judging system that extracts edge areas by applying the Sobel filter to the averaged data; and a second edge judging system that detects thin line areas included in the image represented by the averaged data. Further, the edge judging system may determine that the edge areas are included in the image represented by the averaged data at least one of when the first edge judging system extracts the edge areas and when the second edge judging system detects the thin line areas.

According to the above configuration, either when the first edge judging system detects the edge area using the Sobel filter or the second edge judging system detects the thin line area, the edge judging system judges that the edge area is included. Therefore, even if the first judging system fails to detect the thin line area as the edge area, the second judging system functions to detect the edge area.

It should be noted that any filter may be used as the moving-average filter for the average processing system. For example, the average processing system may generate the averaged data using a moving-average filter corresponding to a resolution of the image data.

With the above configuration, it is possible to generate appropriate averaged data in accordance with the resolution of the image data. It would be further convenient if moving-average filters are selectively used depending on the resolution of the image data. It should be noted that the term "resolution" above implies, if the image data is generated by scanning a predetermined image with a scanner, a resolution of the scanner (pixels per inch) when an image is scanned or the resolution (i.e., the number of lines (lines per inch) of the halftone dots) of the halftone dot area included in the image captured by the scanner.

When the image data is generated with a scanner by scanning a predetermined image, the average processing system may generate the averaged data using the moving-average filter whose size is determined in accordance with a resolution of the scanner when the image is scanned and a number of lines of halftone dots in a halftone dot area included in the image scanned by the scanner.

According to the above configuration, the averaged data can be generated using a moving-average filter suitable to the resolution of the scanner when the image is scanned and the number of lines of the halftone dot areas included in the image to be scanned.

It should be noted that the size of the moving-average filter for the average processing system may be determined in various ways. For example, the average processing system may obtain an odd number closest to a value that is a quotient of the resolution of the scanner divided by the number of lines of the halftone dots in the halftone dot area included in the predetermined image, the averaged data is generated using the moving-average filter configured to have a pixel matrix, the number of pixels in row and column directions of the pixel matrix being equal to the odd number.

According to the above configuration, a moving-average filter composed of a matrix of odd number×odd number is selected depending on the resolution of the image data so that the averaged data can be generated in an appropriate manner.

According to other aspects of the invention, there is provided a method of processing an image, including the steps of: generating a plurality of pieces of component data by applying spatial filters having different functions to image data input externally; generating averaged data by applying to the image data a moving-average filter that smoothes an image represented by the image data; determining whether the image represented by the averaged data includes edge areas; selecting component data corresponding to a determination result of determining from among the plurality of pieces of component data; applying to the image data a smoothing filter that smoothes the image represented by the image data and applying to the image data an edge-enhancing filter that enhances edge areas of the image represented by the image data, transmitting component data which is generated using the smoothing filter if the determining step determines that no edge area is included; and transmitting component data which is generated using the edge-enhancing filter if the edge determining system determines that the edge area is included.

The determining step may determine that the edge areas are included in the image represented by the smoothed data if the edge areas are detected from the averaged data when the Sobel filter is applied to the averaged data.

The determining step may include extracting edge areas by applying the Sobel filter to the averaged data and detecting thin line areas included in the image represented by the averaged data. The determining step may determine that the edge areas are included in the image represented by the averaged data at least one of when the extracting step extracts the edge areas and when the detecting step detects the thin line areas.

The second generating step may generate the averaged data using a moving-average filter corresponding to a resolution of the image data.

When the image data is generated with a scanner by scanning a predetermined image, the applying steps may generate the averaged data using the moving-average filter whose size is determined in accordance with a resolution of the scanner when the image is scanned and a number of lines of halftone dots in a halftone dot area included in the image scanned by the scanner.

The applying steps may obtain an odd number closest to a value that is a quotient of the resolution of the scanner divided by the number of lines of the halftone dots in the halftone dot area included in the predetermined image. The averaged data is generated using the moving-average filter configured to have a pixel matrix, the number of pixels in row and column directions of the pixel matrix being equal to the odd number.

According to further aspects of the invention, there is provided a computer program product including computer readable instructions which cause a computer to execute the steps of the above-described methods.

It should be noted that the program product includes a row of computer readable instructions arranged in a predetermined order. Such instructions may be distributed to computer systems or users of computer systems via a recording medium such as a flexible disk, CD (compact disc), CD-ROM, memory card and the like. Alternatively or optionally, the computer readable instructions may be distributed via a communication network such as the Internet. The computer readable instructions may be provided to users in the form of programs pre-installed on a hard disk or memory of the computer system.

Computer systems that execute the computer readable instructions may be, for example, a computer system provided to an image processing apparatus and/or a computer capable of performing a data communication with an image processing apparatus.

First Embodiment

Hereinafter, referring to the accompanying drawings, an MFP (Multi Function Peripheral) 1 according to a first illustrative embodiment of the invention will be described.

Figure 2:
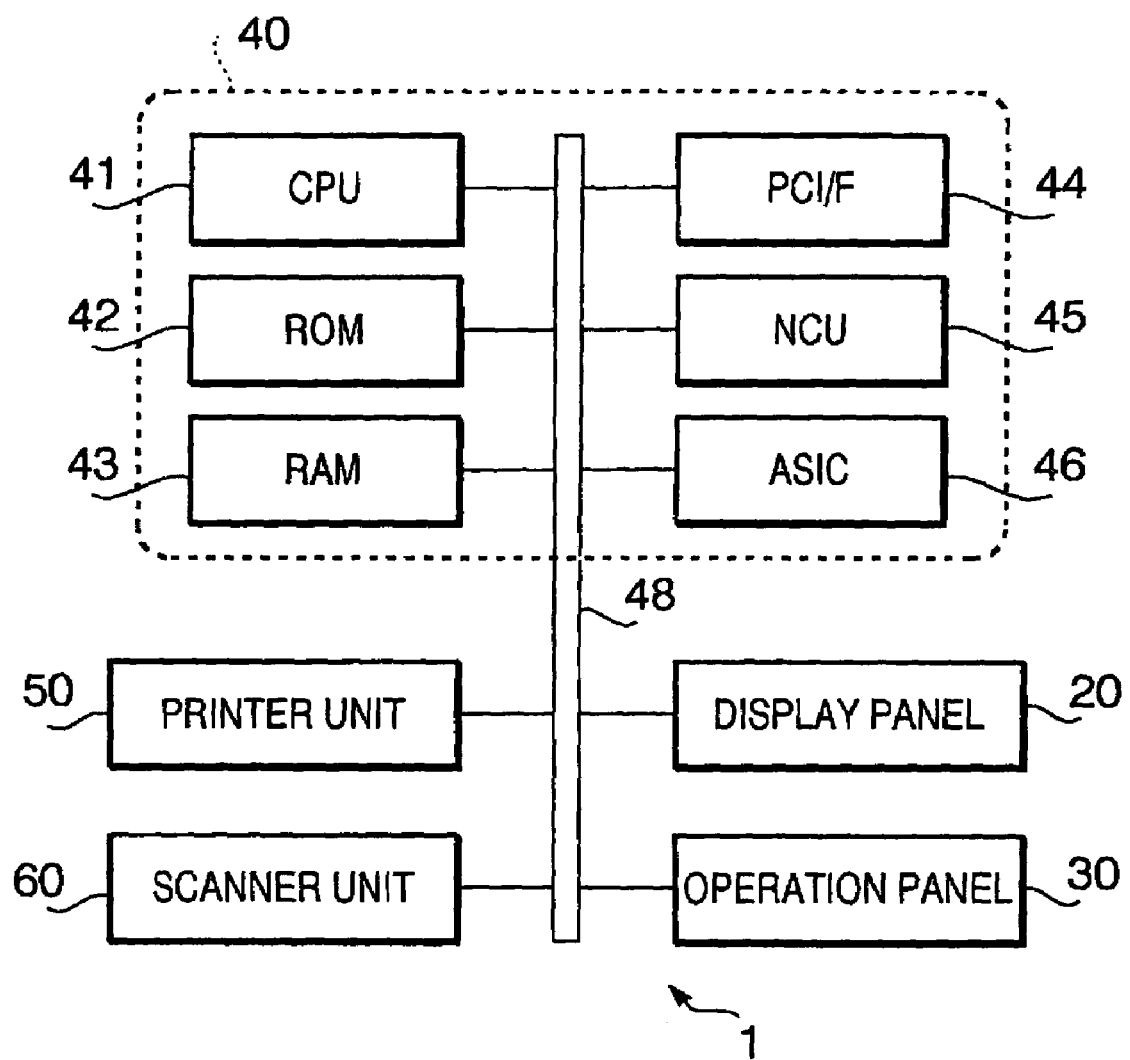
FIG. 2 is a block diagram showing a control system of the MFP shown in FIG. 1.

The MFP 1 is an apparatus having functions of a printer, a copier, a scanner and a facsimile machine. A perspective view of the MFP 1 is shown in FIG. 1. As shown in FIG. 1, the MFP 1 is provided with a recording sheet supplying unit 12 provided at a rear portion of a main body thereof, an original sheet supplying unit 14 provided on a front side with respect to the recording sheet supplying unit 12. The MFP 1 is further provided with a recoding sheet discharging section 16 and an original sheet discharging section 18 which are arranged on a lower front side of the main body of the MFP 1. Further, the MFP 1 includes a display panel 20 provide on an upper surface of the main body at a central portion thereof, and an operation panel 30 provided on the upper surface of the main body at a front part thereof. As shown in the block diagram of a configuration of the MFP 1 in FIG. 2, the MFP 1 includes a control unit 40, a printer unit 50 and a scanner unit 60.

The operation panel 30 has numeric buttons 31 for inputting numerals "0" through "9", an asterisk "*" button 32, a pound "#" button 33, a function button 34 for cyclically switching between available functions (i.e., copy function, scanner function, facsimile function), a setting button 35, a start button 36 and a power button 37.

The control unit 40 includes a CPU (Central Processing Unit) 41, a ROM (Read Only Memory) 42, a RAM (Random Access Memory) 43, a PC (Personal Computer) interface unit (hereinafter, referred to as PC I/F) 44, an NCU (Network Control Unit) 45, and an ASIC (Application Specific Integrated Circuit) 46, which are interconnected through a bus 48.

The CPU 41 controls the entire operation of the MFP 1. Specifically, the CPU 41 follows operational procedures defined by programs stored in the ROM 42, and transmits operational commands to respective operational components of the MFP 1 through the bus 48 temporarily storing operation results in the RAM 43.

The PC I/F 44 interfaces with a PC (personal computer) via a communication cable to perform data communication with the PC.

The NCU 45 is an interface that enables the MFP 1 to be connected with a telephone communication network.

The ASIC 46 is an integrated circuit in which circuits that apply predetermined image processing to image data obtained by the scanner unit 60 are integrally formed.

The printer unit 50 prints out image/characters on the recording sheet while feeding the same set to the recording sheet supplying unit 12 toward the recording sheet discharging section 16. It should be noted that a printing method employed in the printer unit 50 can be any method which can record images/characters on the recording sheet such as an inkjet printing method, electrophotographic method, or thermal transfer method.

The scanner unit 60 scans an image on the original sheet to obtain image data while feeding the original sheet set to the original sheet supplying unit 14 to the original sheet discharging section 18. In this embodiment, the scanner unit 50 reads R (red), G (green) and B (blue) components, which are defined by a well-known RGB color model, of the image on the original.

When the function of the MFP 1 has been switched to the copier function by depressing the corresponding function button 34, and if the start button 36 is depressed, the control unit 40 starts copying the original sheets set to the original sheet supplying unit 14. That is, firstly, a command to read the image of the original set to the original sheet supplying unit 14 is sent to the scanner unit 60. Then, the scanner unit 60 captures the image on the original sheet. This operation will be referred to as capturing of input image data. The input image data is transmitted to the ASIC 46, which processes the image data.

Next, a command to print the thus processed image data on the recording sheet set to the recording sheet supplying unit 12 is sent to the printer unit 50. Then, in response to the command, the printer unit 50 prints out the scanned and processed image on the recording sheet. Accordingly, the copying operation has been executed.

The image processing applied to the input image data by the ASIC 46 will now be described in detail. According to illustrative the embodiment, the input image data which is input to the ASIC 46 is divided into a plurality of pieces of unit data, each unit data consisting of m×n pixels (in this embodiment, 5×5 pixels) centering around a predetermined pixel (which will be referred to as a target pixel).

Figure 9:
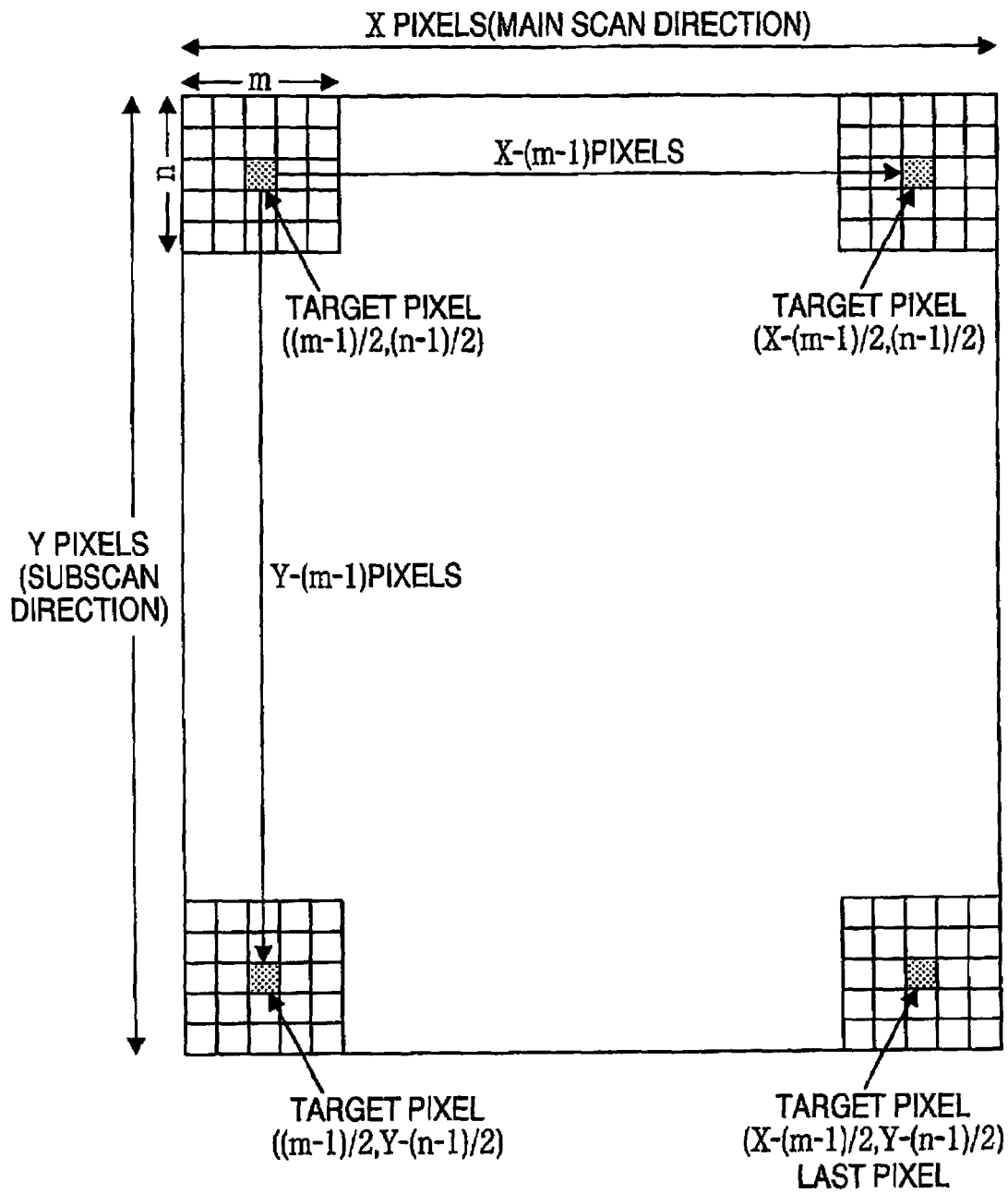
FIG. 9 shows a sequence to input unit image data of an image.

Referring to FIG. 9, a sequence to input unit image data of an image consisting of X×Y pixels, which are arrayed in a matrix of plurality of pixels, will be described below. First, unit image data with a pixel of at a location $((m-1)/2, (n-1)/2)$ (i.e., (2,2), when m=5 and n=5) is input as a first target pixel. Next, second unit image data with second target pixel at $((m-1)/2+1, (n-1)/1)$ (i.e., (3,2), when m=5 and n=5) is input in a YIQ conversion module 110 (see FIG. 3). Here, the second target pixel is located adjoining to the first target pixel in the main scanning direction. Accordingly, target pixel is sequentially displaced to the neighboring pixel in the main scanning direction until it reaches to $(X-(m-1)/2, (n-1)/2)$ (i.e., (X-2, 2) in the illustrative embodiment). After target pixel is reached to the end of the line, the first pixel in the next line $((m-1)/2, (n-1)/2+1)$ (i.e., (2, 3) when m=5 and n=5) becomes target pixel. The target pixel is displaced sequentially in the main scanning direction until unit image data with the target pixel at $(X-(m-1)/2, Y-(n-1))$ is input.

Figure 3:
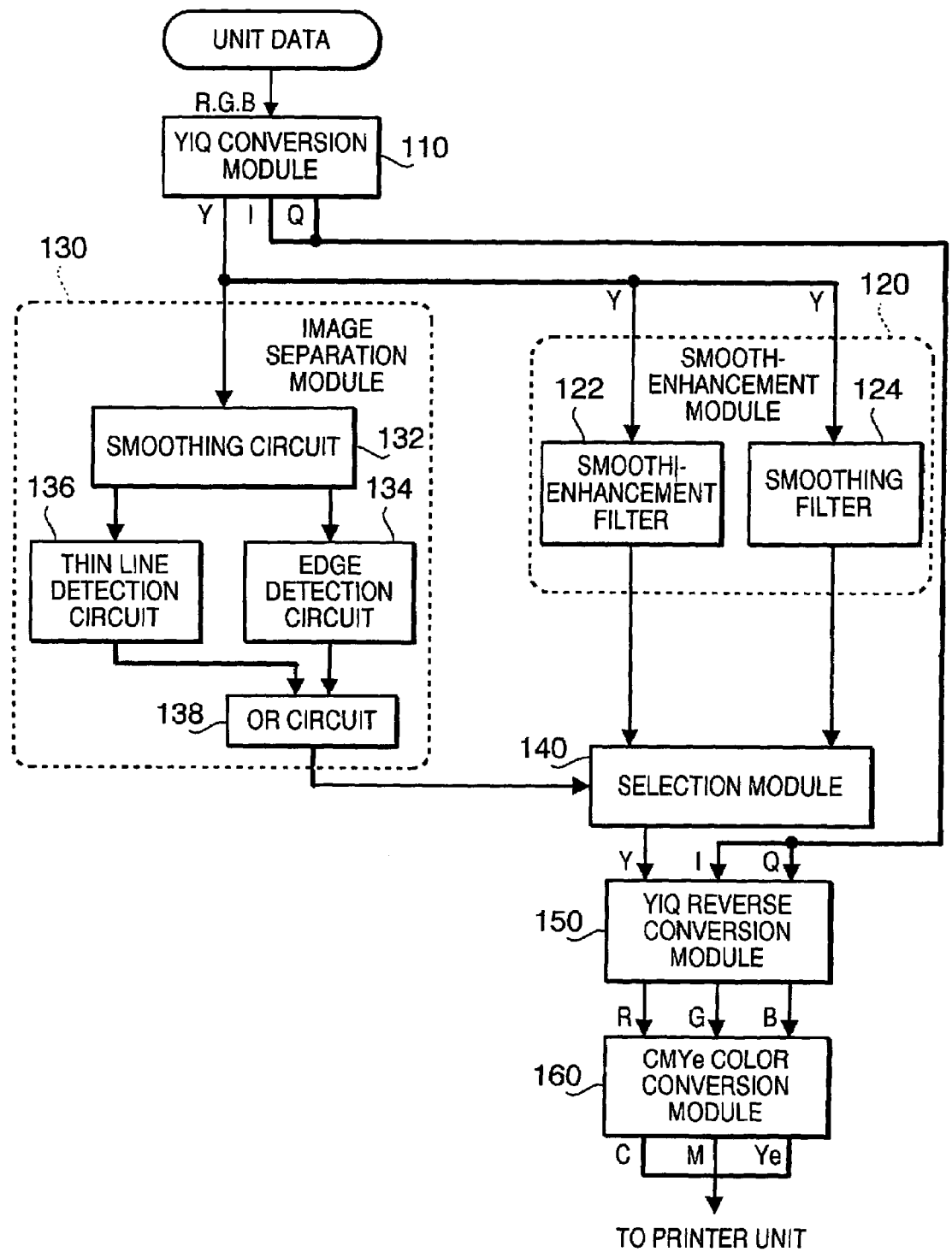
FIG. 3 is a block diagram showing an illustrative electrical configuration of the MFP shown in FIG. 1.

A sequence of unit image data to be input is described above, and it should be noted that a process shown in FIG. 3 is applied to each unit image data to be input, and the target pixel is output as a result. A size of the output pixels is equal to $(X-(m-1))\times(Y-(n-1))$, and a size of pixels for the input image data consisting of X×Y pixels becomes (X−(m−1))× (Y−(n−1)). However, X×Y pixels may be output by applying a certain process to the rims of each image, such as processing the data assuming outside the rims of an image there are provided more data equivalent to the rims of the image.

Each process of filtering is now described below. The ASIC 46 includes, as shown in FIG. 3, the YIQ conversion module 110, a smoothing enhancement module 120, an image area separating module 130, a selection module 140, a YIQ reverse conversion module 150, and a CMY color conversion module 160.

Among the above modules, the YIQ conversion module 110 converts a unit image respectively, which is represented by unit data input from an external device, into an image composed of Y (luminosity), I (In-phase) and Q (quadrature) components in accordance with a well-known YIQ color model.

The smoothing enhancement module 120 is a circuit that filters the Y component among the Y, I and Q components of the image converted by the YIQ conversion module 110. Specifically, the smoothing enhancement module 120 includes a smoothing enhancement filter 122 and a smoothing filter 124.

The smoothing enhancement filter 122 applies smoothing and edge enhancement to the Y component of the unit image data and outputs the processed component to a selection module 140. The smoothing filter 124 applies the smoothing to the Y component of the unit image data and outputs the processed component to the selection module 140.

The smoothing enhancement filter 122 of the smoothing enhancement module 120 is a spatial filter composed of a smoothing filter and a Laplacian filter.

The smoothing filter 124 applies the smoothing and edge enhancement by applying weighting to pixels of the unit image data with respect to the target pixel (i.e., among all the filter coefficients consisting of a matrix of unit image data, the filter coefficient in the center is set greater than the other filter coefficients).

Figure 10:
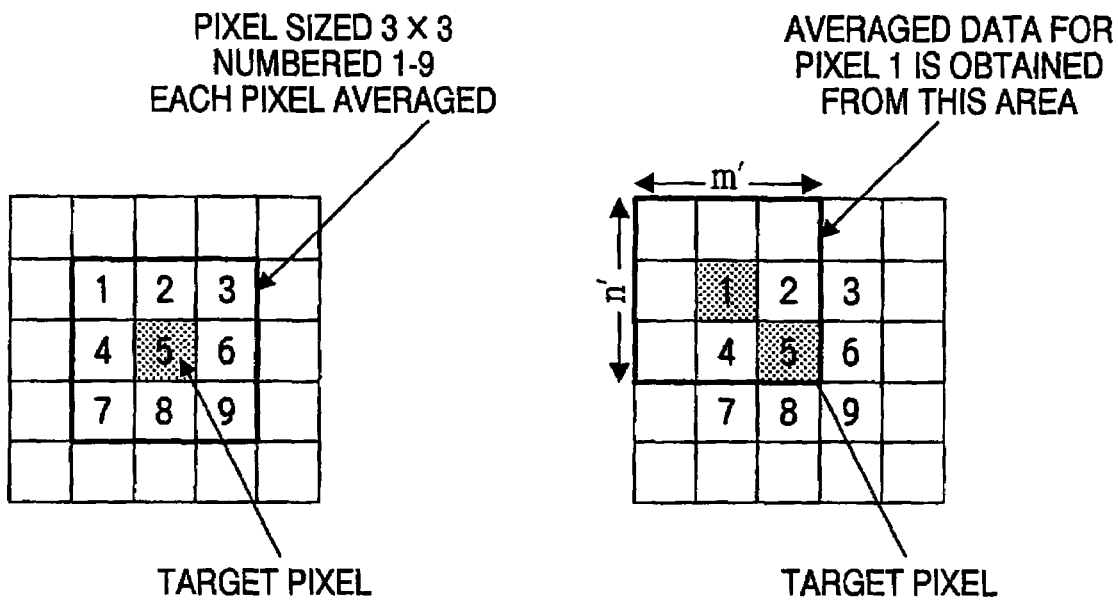
FIG. 10 illustrates a moving-average process applied to nine pixels.

FIG. 10 illustrates a moving-average process applied to nine pixels. As shown in FIG. 10, the moving-average process is applied to nine pixels numbered from 1 to 9, which are arranged centering the target pixel to obtain an average value of m'×n' pixels. Assuming a size of pixels to be applied to the moving-average process is m'×n' pixels, when edges are detected from pixels sized 3×3, m becomes ((m'−1)+3), and n becomes ((n'−1)+3). In this illustrative embodiment (m'=3, n'=3), the value for the pixel 1 is an average of the input image data, which are pixels sized 3×3 centering the pixel 1.

Next, edges are detected from the averaged image data of pixels sized 3×3. In this illustrative embodiment, there is provided an edge detection circuit, which detects whether the averaged image data include edge areas using a Sobel filter. In the edge detection circuit, the image data of pixels sized 3×3 are multiplied by coefficients in horizontal direction and coefficients in vertical directions (see FIG. 15), and each multiplied value is squared. Then the squared values are added, and a square root of the added value is calculated to be compared with a threshold (predetermined) for judging edges (i.e., when the square root of the added value is greater than or equal to the threshold, the image area is judged as an edge included, and when the square root of the added value is smaller than the threshold, the image area is judged as an edge not included) (H is output when an edge is included, and L is output when no edge is included).

Figure 11:
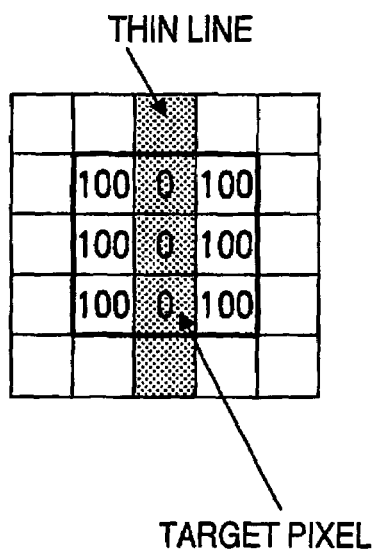
FIG. 11 illustrates a function of Sobel filter.

When using a Sobel filter, however, a thin line on a target pixel (hereinafter a line with a width of one pixel is referred to as "a thin line") cannot be detected as an edge due to the function of the filter (see FIG. 11). Therefore, a thin line detection circuit is provided to detect whether an area consisting of pixels aligned in line is included in the averaged pixels sized 3×3 (level H is out put when an edge is included, and level L is output when no edge is included). In addition, there is provided an OR circuit 138, which outputs a logical addition (OR) of the outputs of the edge detection circuit 134 and the thin line detection circuit 136, whose output (H or L) is sent to the selection module 140.

In the image area separating module 130, the moving-average filter used by the smoothing circuit 132 has a size of m'×n' pixels. The actual value of m' and n' are determined as follows. Firstly, a capturing resolution of the scanner unit 60 (600 dpi in the illustrative embodiment) (dpi; pixel per inch) is divided by the resolution (lpi: lines per inch) of the halftone dots of the original image to be scanned (generally 150-200 lpi). Then, an odd number closer to the divided value (e.g., 600/175=3.45≈3) is taken. The value (e.g., 3) thus obtained is used as the number of the pixels of the rows and lines (e.g., 3×3). The method of detecting a thin line area employed in the thin line detection circuit 136 is described in Japanese Patent Provisional Publication No. P2003-264689A in detail. Accordingly, the operation of the thin line detection circuit 136 will be omitted herein for brevity.

Usability of applying moving-average process to pixels m'×n' before edge detection will be described hereinafter. Usability of the resolution of the halftone dots to be scanned by the scanner unit 60 will be described below. Here, m' is the resolution to be scanned by a scanner in the main scan direction divided by the resolution of the halftone dot, and n' is the resolution to be scanned in the sub scan direction divided by the resolution of the halftone dot.

Referring to FIGS. 12A, 12B, 12C and 12D, in this illustrative embodiment, image data including a halftone dot area with a halftone dot in every three pixels is used as an example. When the capturing resolution of the scanner is 600 dpi for both of the main and the sub scan directions, the resolution of the halftone dots of the original image with a halftone dot occurring in every three pixels is 200 lpi. With these resolutions, both m' and n' are 3 (i.e., 600/200). Thus, the moving-average process is applied to the pixels of 3×3, with a target pixel moved from one pixel to another in the main scan direction.

As shown in FIG. 12E, when the luminosity of a halftone dot (i.e., a target pixel) is 0 and the luminosity of the other surrounding pixels is 100, the averaged value of each pixel in the area 3×3 is 89 (i.e., 800/9=89) (see FIG. 12F). Thus, with this moving-average process, the luminosities of the halftone dot and the neighboring pixels become the same values, or at least approximate values. In addition, by applying the edge detection process to luminous components in a matrix size of m'×n' that are already averaged, the luminosity difference between the halftone dot and the neighboring pixels becomes less, and the halftone dot can prevent from being judged as an edge.

Next, the usability of the Sobel filter will be described. When the resolution of the halftone dots is close to the capturing resolution of the scanner, however, it is difficult to estimate number of the lines of the halftone dots. Therefore, it is preferred that the resolution of the halftone dots should be from 150 to 200 lpi. In this illustrative embodiment, the resolution is 175 lpi (i.e., the average of 150 and 200), and m' and n' are 3. Image data with halftone dots is shown in FIG. 13A as an example. In addition, FIG. 13B is the same image data after the average process on 3×3 pixels is applied. Further, FIG. 13C is the same image data after the Sobel filter is applied to the averaged pixels, and FIG. 13D is the same image data after the Laplacian filter is applied. Also, FIG. 12G shows the same image data after the Sobel filter is applied to the averaged pixels, which is shown in FIG. 12F. In this illustrative embodiment, the coefficients in each edge detecting filter are the same luminosity as the edge indicated in the image data of FIG. 12A.

With these results, it should be noted that luminosity difference between the pixels in the image output after the Laplacian filter is applied is more distinct than the image output after the Sobel filter is applied.

Referring to FIGS. 14A, 14B, 14C and 14D, the image output with more gradual edges is described. As shown in FIG. 14D, edge areas are judged as edges when the luminosity values are greater than or equal to a threshold, which is 6.7 (absolute value) in this illustrative embodiment.

When the Laplacian filter is applied, the threshold to detect edges should be greater than 11, or the halftone dot is to be judges as an edge (see FIG. 13D). With the threshold greater than 11, however, edges that are more gradual as shown in FIGS. 14A, 14B, 14C, and 14D may not be detected properly.

When the Sobel filter is applied, on the other hand, the threshold to detect edges from the image data can be greater than 3.4 and less than 17 (see FIG. 12A through FIG. 14D). With this function, edges in FIG. 14A that are rather graduate can be judged as edges, while the halftone dot area in FIG. 13A can be judges as non-edge area.

Therefore, as described above, for image data with halftone dot areas that may not equally be averaged, the Sobel filter (primary differentiation filter) may be more effective than the Laplacian filter (secondary differentiation filter), which is generally effective for the edge enhancing process.

Next, the usability of thin line detection will be described. As described above, thin lines cannot be detected by applying the Sobel filter. When the Sobel filter is applied to the vertical thin line that appears on the target pixel (grayed pixels shown in FIG. 11) for example, luminosity for edge detection is 0. Therefore, it is necessary to detect thin lines with the thin line detection circuit separately from edge detection, and the output is combined with the output of the edge detection. In this illustrative embodiment, a "thin line" refers to a line with a width of one pixel that appears on a target pixel, and a line of pixels with low luminosity aligned vertically, horizontally, or obliquely.

In the illustrative embodiment, the image area separating module 130 outputs the logical addition of the outputs of the edge detection circuit 134 and the thin line detection circuit 136 as the detection result of the edge areas. It should be noted that the thin line detection circuit 136 is employed to compensate for a failure of detection by the edge detection circuit 134.

As described above, the edge detection circuit 134 detects the edge areas using the Sobel filter. The Sobel filter uses the pixels other than those aligned in a line with the target pixel located at the center thereof. Therefore, if the pixels representing an edge area are aligned in a line, the area, which should be detected as the edge area, may not be detected as the edge area due to the arrangement of the pixels. Therefore, in order to ensure that such an area can also be detected correctly, the thin line detection circuit 136 is employed for compensation.

If the output of the image area separating module 130 is L level, i.e., if the image area separating module 130 does not detect the edge area (including the thin line area), the selection module 140 transmits the image data which is smoothed using the smoothing filter 124 to the YIQ reverse conversion module 150.

If the output of the image area separating module 130 is H level, i.e., if the image area separating module 130 has detected the edge area (including the thin line area), the selection module 140 transmits the image data, to which the smoothing enhancement is applied using the smoothing enhancement filter 122, to the YIQ reverse conversion module 150.

As above, the section module 140 selectively outputs the components which are generated using the smoothing enhancement filter 122 or the smoothing filter 124 depending on whether the Y component converted by the YIQ conversion module 110 includes the edge area (including the thin line area) or not.

The YIQ reverse conversion module 150 receives the Y component output by the selection module 140 and I and Q components output by the YIQ conversion module 110, and converts the received components into R, G and B components constituting a unit image data, which is transmitted to the CMY color conversion module 160.

The CMY color conversion module 160, which received the unit image consisting of the R, G and B components from the YIQ reverse conversion module 150, converts the received image data into image data having C, M and Ye components defined by the well-known CMY color model, which are transmitted to the printer unit 50 subsequently.

After the above procedure has been applied to all the pieces of the unit data, an image represented by all the pieces of the unit data is printed by the printer unit 50.

According to the ASIC 46 of the MFP 1 configured as above, the spatial filter related to the components output by the selection module 140 (i.e., the spatial filter used in the smoothing enhancement module 120) and the spatial filter related to the edge area detection (i.e., the moving-average filter used in the smoothing circuit 132) are different filters. Therefore, it is possible that parameters appropriate for generating the components output by the selection module 140, and parameters enabling the appropriate smoothing (averaging) can be set individually. Thus, it is not necessary to set parameters satisfying a plurality of conditions (i.e., appropriate for generating the components and appropriate for the smoothing) as in a conventional spatial filter that relates both the edge area detection and generation of the components. This functional feature improves design freedom of circuitry of the ASIC 46.

That is, as a filter that only relates to the edge detection, one whose parameters are adjusted to smooth the image data so that the halftone dots components will not be detected as the edge areas can be used, independent from a spatial filter used in generating the components.

It may be possible to use a generally-known smoothing filter that applies weighting with the target pixel being regarded as the central pixel of unit data as in the conventional system in the smoothing circuit 132 of the image area separating module 130. However, in such case, since the target pixel is located in the halftone dots, although a certain degree of smoothing may be expected, the smoothing may not be sufficiently done and at least part of the halftone dots may be determined to be the edge area(s) if the difference (contrast) between the target pixel and peripheral pixels is relatively large. Therefore, it is not preferable to use the conventional smoothing method.

On the contrary, according to the above-described illustrative embodiment, since the moving-average filter is used for the smoothing, the component of the target pixel is averaged with the components of the peripheral pixels (including the target pixel itself). Therefore, even if the target pixel is located at the center of the halftone dot area, the components are averaged as a whole, and thus the halftone dots will not be determined as the edge area.

In the image area separating module 130, the edge detection circuit 134 extracts the edge area using the Sobel filter, and based on the fact that the edge area is extracted, the edge detection circuit 134 determines that the edge area is included in the unit image.

In the above-described illustrative embodiment, the edge detection circuit 134 detects the edge area using the Sobel filter from the components averaged by the smoothing circuit 132 using the moving-average filter. It should be noted that using the Sobel filter with respect to the components averaged by the moving-average filter is preferable since the halftone dots area will not be detected as an edge area in comparison with a case where another spatial filter (e.g., Laplacian filter) is used.

The image area separating module 130 outputs the logical addition of the outputs of the edge detection circuit 134 and the thin line detection circuit 136 as the detection result of the edge area. Therefore, not only in a case where the edge detection circuit 134 detects the edge area using the Sobel filter, but in a case where the thin line detection circuit 136 detects the thin line area, it is regarded that the edge area is detected. With this configuration, even if the edge detection circuit 134 fails to detect the thin line area, it is detected by the thin line detection circuit 136. Thus, it is ensured that edge detection can be performed without fail.

The size of the moving-average filter employed in the smoothing circuit 132 of the image area separating module 130 is determined in accordance with the resolution of the scanner unit 60 and the resolution of the halftone dots on the original to be scanned by the scanner unit 60. That is, according to the illustrative embodiment described above, the moving-average filter suitable to the resolutions regarding the image is used and the smoothing is performed appropriately. Thus, the edge detection can be performed based on the appropriately generated components.

It should be noted that the invention need not be limited to the configuration of the above-described illustrative embodiment, and can be modified in various ways without departing from the scope of the invention.

For example, in the above-described embodiment, the ASIC 46 is provided to the MFP. However, it is only an illustrative example, and the ASIC may be provided to another device.

Further, the circuitry need not be limited to the ASIC but another circuit/device such as a PLD (Programmable Logic Device) may be employed instead.

In the above-described embodiment, the size of the moving-average filter employed in the smoothing circuit 132 of the image area separating module 130 is determined in accordance with both the resolution of the scanner unit 60 and the resolution of the halftone dots on the original to be scanned by the scanner unit 60. This may be modified such that the size of the moving-average filter may be determined in accordance with only one of the resolution of the scanner unit 60 and the resolution of the halftone dots on the original to be scanned by the scanner unit 60.

In the above-described illustrative embodiment, the moving-average filter having a predetermined size is used in the smoothing circuit 132. This configuration is only an exemplary one, and it may be possible to configure the image area separating module 130 to vary the size of the moving-average filter in accordance with one or both of the resolution of the scanner unit 60 and the resolution of the halftone dots.

To realize the variable size of the moving-average filter, the following configuration may be employed. That is, prior to the copying operation (i.e., when the start button 36 is depressed), the CPU 41 requests the user to input the resolution of the halftone dots through the operation panel 30. Alternatively or optionally, the CPU 41 may performs a frequency analysis of an image scanned by the scanner unit 60 to calculate the resolution of the halftone dots. Then, based on the obtained (input/calculated) resolution, the size of the moving-average filter is determined as described above. Then, the CPU 41 may send a command indicating the usage of the moving-average filter of the obtained size to the ASIC 46. Thereafter, the CPU 41 may start inputting the image data to the ASIC 46.

It should be noted that, if the resolution of the scanner unit 60 is fixed, the CPU 41 may request the user to input only the resolution of the halftone dots. If the scanner unit 60 is configured such that the resolution thereof is variable, the resolution currently set may be stored in the RAM 43, and the stored value may be used when the size of the moving-average filter is determined.

Second Embodiment

Figure 8:
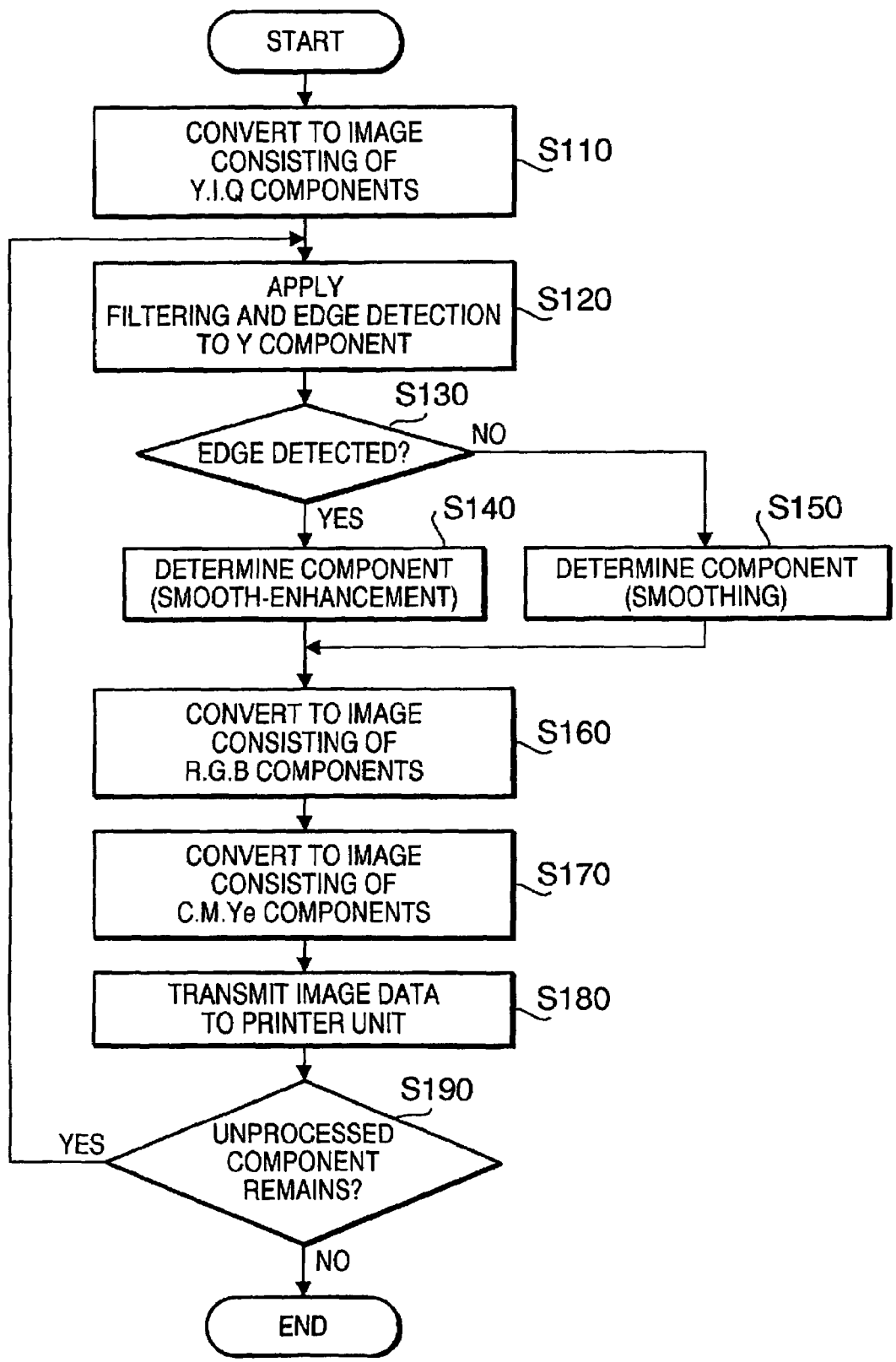
FIG. 8 is a flowchart illustrating an image processing procedure.

In the above illustrative embodiment, the image processing is executed by a hardware (i.e., ASIC 46). The processing may be executed using software instead of the hardware. Such a configuration will be described hereafter as a second illustrative embodiment with reference to FIG. 8, which is executed when the image data is read by the scanner unit 60.

In S110, an input image represented by input image data is converted into Y, I and Q component images. In this step, the image processing similar to that executed by the YIQ conversion module 110 of the first illustrative embodiment is executed, and the Y components of unit images (i.e., first to n-th unit images) are generated, respectively.

Next, to one of the Y components of the unit images converted in S140, the filtering procedure is executed with respect to the Y component, and the edge area is separated (S120). In this step, a procedure similar to that executed by the smoothing enhancement module 120 of the first illustrative embodiment is performed and the smooth-enhanced components and the smoothed components are generated. Further, a procedure similar to that executed by the image area separating module 130 is executed, and an edge area is separated (detected).

Next, in S130, control judges whether the edge area has been separated from the Y component. If the edge area has been separated (S130: YES), control determines that the component to which smooth enhancement is applied in S120 is the component to be used afterward (S140). If the edge area has not been separated (S130: NO), control determines that the component to which the smoothing is applied in S120 is the component to be used afterward (S150).

In S160, an image composed of the Y components determined in S140 or S150, and the I and Q components of the image converted in S110 are converted into an image composed of the R, G and B components. In S160, for converting the image having Y, I and Q components to an image composed of the R, G and B components, processing similar to that performed by the YIQ reverse conversion module 150 of the first illustrative embodiment is executed.

Next, the image data representing an image composed of the C, M and Ye components, which has been converted in S170, is transmitted to the printer unit 50 (S180).

In S190, control judges whether there are unprocessed Y components among those generated in S110. If there are one or more unprocessed Y components (S190: YES), control returns to S120 to process each of the unprocessed Y components. The Y components may be processed sequentially in the order of the first to n-th unit images.

As the processing is executed and all the Y components have been processed (S190: NO), control finishes the procedure shown in FIG. 8.

Experiment Result

Hereinafter, results of experiments carried out to determine a spatial filter to be used in the ASIC 46 will be described.

Figures 4A, 4B, 4C:
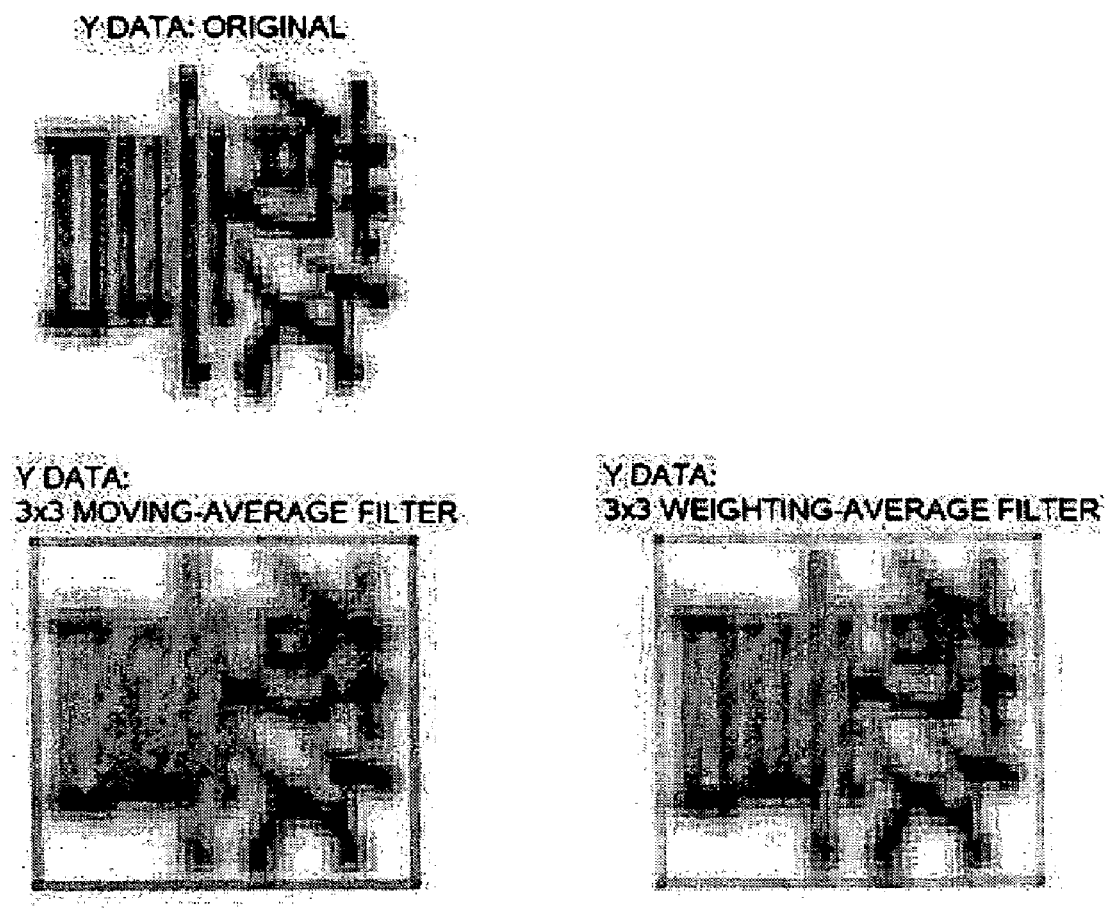
FIGS. 4A-4C show results of an experiment.

FIGS. 4B and 4C respectively show experiment results when a 3×3 moving-average filter and a 3×3 weighting-average filter are applied, as the smoothing filter 124 of the smoothing enhancement module 120, to an original shown in FIG. 4A. Each of the 3×3 moving-average filter and 3×3 weighting-average filter is configured such that a blur of edges which have not been detected are suppressed to a certain degree. It is understood, by comparing FIG. 4B with FIG. 4C, that the blur at the edge areas is less significant when the weighting-average filter (FIG. 4C) is used. That is, in view of reproducibility, the weighting-average filter is better than the moving-average filter. Thus, in the first illustrative embodiment, the weighting-average filter is used as the smoothing filter 124.

Figure 5A:
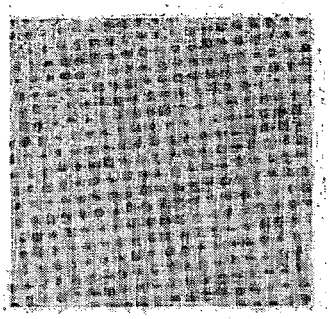
FIGS. 5A-5E show results of another experiment.
Figure 5B:
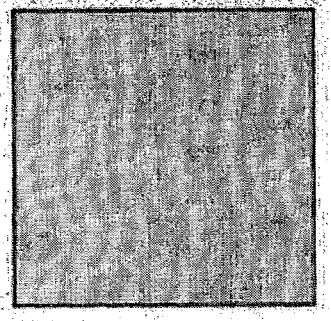
Figure 5C:
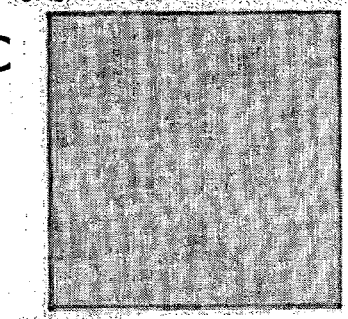
Figure 5D:
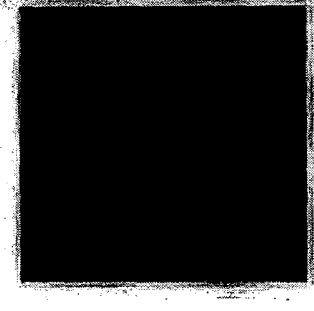
Figure 5E:
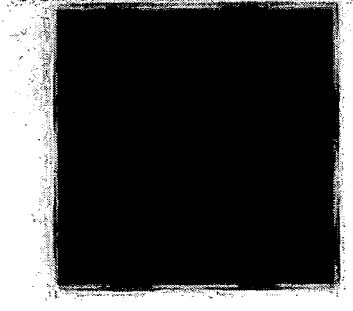

FIGS. 5B and 5C respectively show results when a 3×3 moving-average filter and a 3×3 weighting-average filter are applied, as the smoothing filter 132 of the image area separating module 130, to the Y component of an original image including the halftone dots as shown in FIG. 5A. FIGS. 5D and 5E show experiment results when the 3×3 Sobel filter is applied for edge detection to the results shown in FIGS. 5B and 5C, respectively.

By comparing the experiment results shown in FIGS. 5B-5D, when the smoothing filter is applied, the image corresponding to the moving-average filter appears with less halftone dots than the image corresponding to the weighting-average filter. After the Sobel filter has been applied and edge detection is performed, it appears that the halftone dot areas are detected as edge areas less in a case where the moving-average filter is used than in a case where the weighting-average filter is used.

Figure 6:
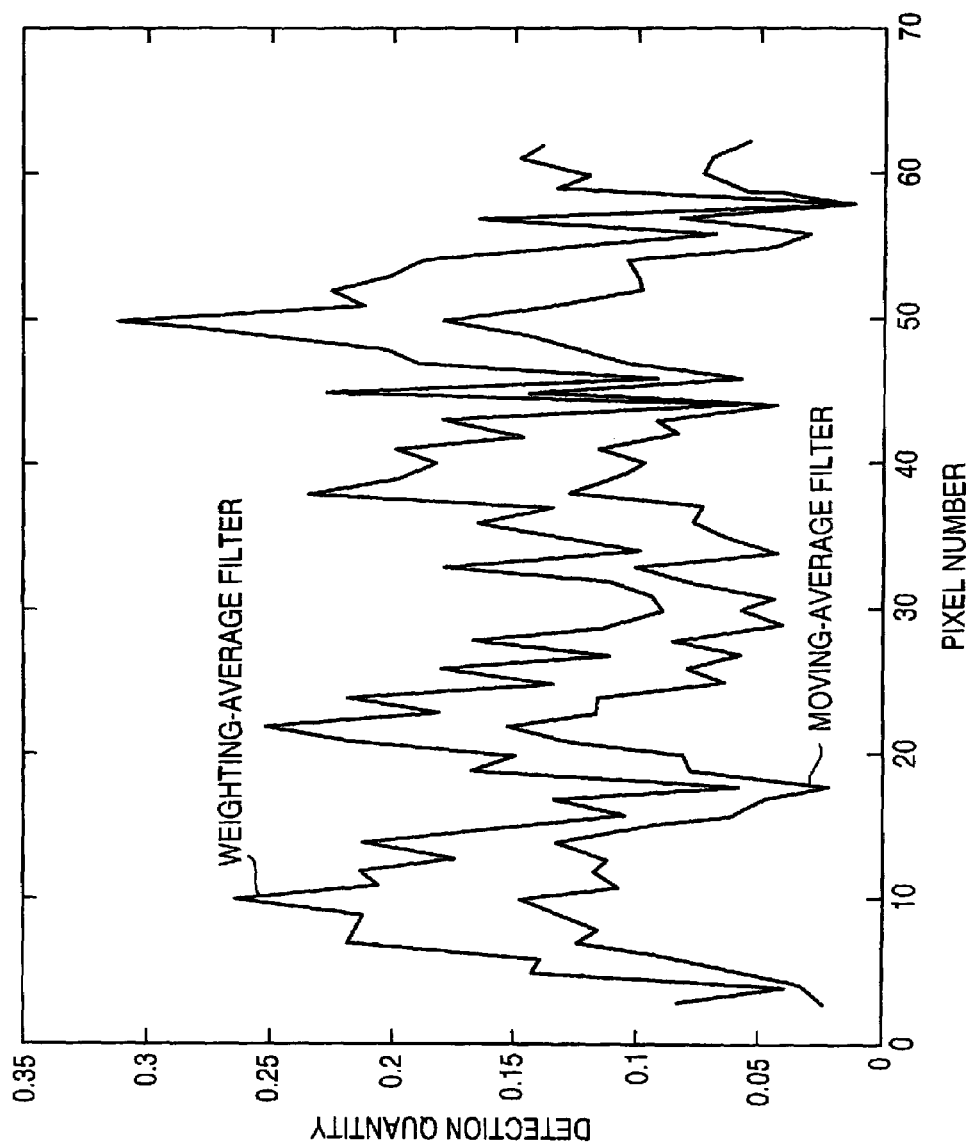
FIG. 6 shows a graph illustrating results of an experiment.

The above results are clearly indicated in a graph shown in FIG. 6. The graph shown in FIG. 6 indicates a detection amplitude of each pixel of a certain line, in a horizontal direction, of a result of the edge detection. Specifically, the horizontal axis of the graph indicates a pixel number of one line, and the vertical axis indicates the detection amplitude of each pixel. In the graph, the results when the weighting-average filter is used and when the moving-average filter is used are shown.

From the graph, it is understood that the detection amplitude is smaller in a case where the moving-average filter is used than in a case where the weighting-average filter is used for almost all the pixels. Thus, in the former case, it is less likely that the halftone dots area is detected as the edge areas.

As above, it is known that the moving-average filter is more suitable as the filter to be employed in the smoothing circuit 132 of the image area separating module 130. Therefore, in the first illustrative embodiment, the moving-average filter is employed in the smoothing circuit 132.

Figure 7A:
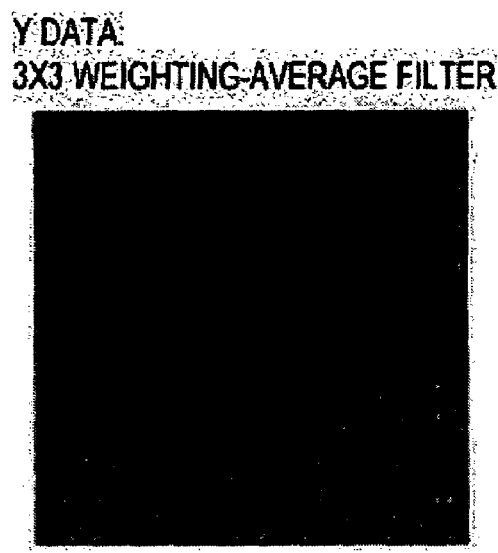
FIGS. 7A-7C show results of a further experiment.
Figure 7B:
Figure 7C:
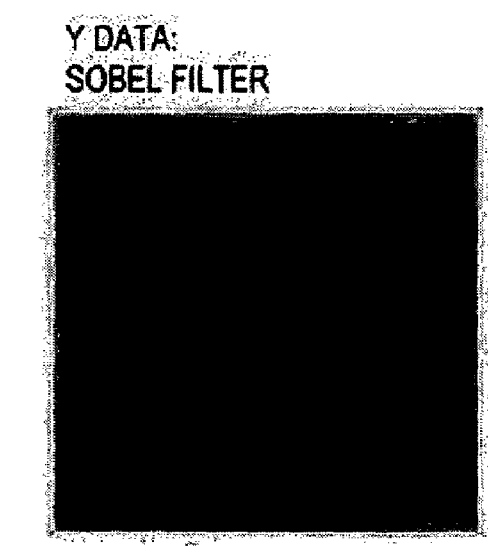

FIGS. 7B and 7C respectively show experiment results when a 3×3 Laplacian filter and a 3×3 Sobel filter are applied, as the spatial filter for edge detection in the edge detection circuit 134 of the image area separating module 130, to the result of applying the 3×3 moving-average filter to an original image including the halftone dots, as shown in FIG. 7A.

It is understood from the results shown in FIGS. 7B and 7C that, for the original image including the halftone dot area, the halftone dot areas are detected as the edge areas less in a case where the Sobel filter is used than in a case where the Laplacian filter is used. The Laplacian filter uses secondary differentiation placing the target pixel at the center. Therefore, the Laplacian filter is suitable when a sharper enhancement is intended. On the other hand, when the halftone dot coincides with the target pixel, the Laplacian filter tends to detect the halftone dot relatively greater (i.e., the components of the halftone dots tend to be enhanced easier). In contrast, the Sobel filter uses pixels adjacent to the target pixel, and an effect of local noise can also be suppressed. Therefore, in the halftone dot area which includes a plurality of dots (halftone dots), the Sobel filter may reduce the effect by a certain degree.

As above, in the edge detection circuit 134 of the image area separating module 130, it becomes known that the Sobel filter which is less sensitive in detecting the halftone dot areas as the edge area, and that, in the edge detection, accurate detection is required more than sharp reproducibility. Therefore, in the above illustrative embodiment, the edge detection circuit 134 is configured to employ the Sobel filter.

It should be noted that, the Sobel filter is not suitable for detecting a thin line since the target pixel is not used. In particular, if the reproducibility of thin line is also important, it is necessary to detect the thin line accurately. For this purpose, in the above-described illustrative embodiment, the thin line detection circuit 136 is also employed. It should be noted that, in the smooth enhancement filter 122, in order to realize improved reproducibility with a sharper edge enhancement, the Laplacian filter is employed.

Although examples of carrying out the invention have been described, those skilled in the art will appreciate that there are numerous variations and permutations of the above described devices that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

What is claimed is:

1. An image processing apparatus, comprising:
a component extracting system that extracts a luminance component and chrominance components from image data consisting of a plurality of image pixels arrange in a matrix;
a first filter that is applied to the extracted luminance component and not the chrominance components to generate first data;
an edge detecting system that detects an edge in the first data;
a second filter that is applied to the extracted luminance component and not the chrominance components to generate second data;
a third filter that is applied to the extracted luminance component and not the chrominance components to generate third data;
an outputting system that outputs the second data and the third data;
a selection controlling system that controls, in response to the result of edge detection, the outputting system to selectively output one of the second data and the third data; and a conversion system that converts the extracted chrominance components and the one of the second data and the third data selectively output by the outputting system into RGB components.

2. The image processing apparatus according to claim 1, wherein the first filter is a smoothing filter that applies an a×b matrix spatial filter to the luminance component for smoothing, and all the filtering factors constituting the first filter are equal to each other.

3. The image processing apparatus according to claim 1, wherein the second filter is a smoothing filter that applies a c×d matrix spatial filter to the luminance component for smoothing, and all the filtering factors constituting the second filter are configured such that filter coefficients at a central portion of the spatial filter are larger than the filter coefficients at the other portion.

4. The image processing apparatus according to claim 1, wherein the third filter includes:
a smoothing filter that applies a c×d matrix spatial to the luminance component for smoothing; and
an enhancing filter that enhances the smoothed luminance component in accordance with the edge detected by the edge detecting system.

5. The image processing apparatus according to claim 1, wherein the edge detecting system includes:
a first edge detecting system that applies a primary differentiation to the first data; and
a second edge detecting system that detects continuous pixels including a target pixel from the first data.

6. The image processing apparatus according to claim 1, further including a calculating system that calculates values of a and b representing a size of the matrix in accordance with a resolution of the image data and the number of halftone dot lines in halftone dot areas included in the image data.

7. The image processing apparatus according to claim 6, wherein the calculating system determines odd numbers close to the results of division of resolutions in a main scanning direction and an auxiliary scanning direction by the number of halftone lines as the values of a and b, respectively.

8. A method of processing image data employed in an image processing apparatus, comprising the steps of:
extracting a luminance component and chrominance components from image data consisting of a plurality of image pixels arrange in a matrix;
applying a first filter to the extracted luminance component and not the chrominance components to generate first data;
detecting an edge in the first data;
applying a second filter to the extracted luminance component and not the chrominance components to generate second data;
applying a third filter to the extracted luminance component and not the chrominance components to generate third data;
selectively outputting, in response to the result of edge detection, one of the second data and the third data; and
converting the extracted chrominance components and the one of the second data and the third data selectively output into RGB components.

9. The method according to claim 8,
wherein the first filter is a smoothing filter that applies an a×b matrix spatial filter to the luminance component for smoothing, and all the filtering factors constituting the first filter are equal to each other.

10. The method according to claim 8,
wherein the second filter is a smoothing filter that applies a c×d matrix spatial filter to the luminance component for smoothing, and all the filtering factors constituting the second filter are configured such that filter coefficients at a central portion of the spatial filter are larger than the filter coefficients at the other portion.

11. The method according to claim 8,
wherein the third filter includes:
a smoothing filter that applies a c×d matrix spatial to the luminance component for smoothing; and
an enhancing filter that enhances the smoothed luminance component in accordance with the edge detected by the step of detecting.

12. The method according to claim 8,
wherein the step of detecting includes:
applying a primary differentiation to the first data; and
detecting continuous pixels including a target pixel from the first data to which the primary differentiation is applied.

13. The method according to claim 8,
further including the step of calculating values of a and b representing a size of the matrix in accordance with a resolution of the image data and the number of halftone lines in halftone dot areas included in the image data.

14. The method according to claim 13,
wherein the step of calculating determines odd numbers close to the results of division of resolutions in a main scanning direction and an auxiliary scanning direction of the image data by the number of halftone lines as the values of a and b, respectively.

15. A tangible computer readable medium having computer readable instructions stored thereon, which when executed by a processor in an image processing apparatus perform a method of processing image data comprising the steps of:
extracting a luminance component and chrominance components from image data consisting of a plurality of image pixels arrange in a matrix;
applying a first filter to the extracted luminance component and not the chrominance components to generate first data;
detecting an edge in the first data;
applying a second filter to the extracted luminance component and not the chrominance components to generate second data;
applying a third filter to the extracted luminance component and not the chrominance components to generate third data;
selectively outputting, in response to the result of edge detection, one of the second data and the third data; and
converting the extracted chrominance components and the one of the second data and the third data selectively output into RGB components.

16. The computer readable medium according to claim 15, wherein the first filter is a smoothing filter that applies an a×b matrix spatial filter to the luminance component for smoothing, and all the filtering factors constituting the first filter are equal to each other.

17. The tangible computer readable medium according to claim 15,
wherein the second filter is a smoothing filter that applies a c×d matrix spatial filter to the luminance component for smoothing, and all the filtering factors constituting the second filter are configured such that filter coefficients at a central portion of the spatial filter are larger than the filter coefficients at the other portion.

18. The tangible computer readable medium according to claim 15,
    wherein the third filter includes:
    a smoothing filter that applies a c×d matrix spatial to the luminance component for smoothing; and
    an enhancing filter that enhances the smoothed luminance component in accordance with the edge detected by the step of detecting.

19. The tangible computer readable medium according to claim 15,
    wherein the step of detecting includes:
    applying a primary differentiation to the first data; and
    detecting continuous pixels including a target pixel from the first data to which the primary differentiation is applied.

20. The tangible computer readable medium according to claim 15,
    wherein the method further includes the step of calculating values of a and b representing a size of the matrix in accordance with a resolution of the image data and the number of halftone lines in halftone dot areas included in the image data.

* * * * *

UNITED STATES PATENT AND TRADEMARK OFFICE
CERTIFICATE OF CORRECTION

PATENT NO. : 7,627,192 B2  Page 1 of 1
APPLICATION NO. : 11/175394
DATED : December 1, 2009
INVENTOR(S) : Atsushi Yokochi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 999 days.

Signed and Sealed this

Second Day of November, 2010

David J. Kappos
*Director of the United States Patent and Trademark Office*